(12) United States Patent
Alonso et al.

(10) Patent No.: US 9,317,583 B2
(45) Date of Patent: Apr. 19, 2016

(54) DYNAMIC CAPTIONS FROM SOCIAL STREAMS

(71) Applicant: Microsoft Corporation, Redmond, WA (US)

(72) Inventors: Omar Alonso, Redwood Shores, CA (US); Shankar Kalyanaraman, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 13/645,533

(22) Filed: Oct. 5, 2012

(65) Prior Publication Data

US 2014/0101145 A1 Apr. 10, 2014

(51) Int. Cl.
*G06F 17/30* (2006.01)

(52) U.S. Cl.
CPC .................. *G06F 17/30616* (2013.01)

(58) Field of Classification Search
CPC ............... G06F 17/30867; G06F 17/30861; G06F 17/30997; G06F 17/30477; G06F 17/30979; G06F 17/30991
See application file for complete search history.

(56) References Cited

U.S. PATENT DOCUMENTS

| 7,257,598 | B2 * | 8/2007 | Toivonen et al. | |
| 8,086,605 | B2 | 12/2011 | Xu et al. | |
| 2005/0091202 | A1 | 4/2005 | Thomas | |
| 2005/0246193 | A1 * | 11/2005 | Roever et al. | 705/1 |
| 2005/0256866 | A1 * | 11/2005 | Lu et al. | 707/5 |
| 2007/0078884 | A1 * | 4/2007 | Ott et al. | 707/102 |
| 2011/0196855 | A1 * | 8/2011 | Wable et al. | 707/711 |
| 2011/0225152 | A1 | 9/2011 | Beaudreau et al. | |
| 2011/0264648 | A1 | 10/2011 | Gulik et al. | |
| 2011/0270830 | A1 * | 11/2011 | Stefik et al. | 707/731 |
| 2011/0314007 | A1 * | 12/2011 | Dassa et al. | 707/723 |
| 2012/0158720 | A1 | 6/2012 | Luan et al. | |
| 2013/0036109 | A1 * | 2/2013 | Kulick et al. | 707/722 |

OTHER PUBLICATIONS

Bao, et al., "Optimizing Web Search Using Social Annotations", Retrieved at <<http://www.www2007.org/papers/paper397.pdf >>, In Proceedings of the 16th international conference on World Wide Web, May 8, 2007.
Noll, et al., "The Metadata Triumvirate: Social Annotations, Anchor Texts and Search Queries", Retrieved at <<http://ieeexplore.ieee.org/stamp/stamp.jsp?tp=&arnumber=4740524>>, Proceedings: IEEE/WIC/ACM International Conference on Web Intelligence and Intelligent Agent Technology, Dec. 9, 2008.
"Earned Media Optimization: The Integration of SEO and Social Media", Retrieved at <<http://www.thesearchagency.com/whitepapers/TSA_white_paper_Search_and_Social.pdf>>, Jun. 2011.

* cited by examiner

*Primary Examiner* — Jay Morrison
(74) *Attorney, Agent, or Firm* — Dave Ream; Douglas Barker; Micky Minhas

(57) ABSTRACT

Architecture that augments a search result entry caption with keywords related to topics currently being shared and discussed in other social network information sources. This can provide a much better idea of the content of the website or webpage. The architecture obtains a link from updates of social topics of social network information sources (e.g., social networks for people places professionals, etc.), extracts title content of a document title associated with the link, compares the title content to document text for similarity to create non-duplicative content, creates keywords related to popular social topics from the non-duplicative content, and then augments a search result entry of a search result page with the keywords of the popular social topics.

20 Claims, 8 Drawing Sheets

DYNAMIC CAPTIONS FROM SOCIAL STREAMS

BACKGROUND

The current search engine results page shows a title, caption, and link to webpage or website. Typically, the caption is static and does not change. With the recent increase in user engagement in social networking, millions of users post and share updates with friends and followers on a daily basis. The rise in the use of social media such as microblogging sites and social networks for people, for example, has become a significant driver of Internet traffic towards websites. While using such media, users not only share content and links to webpages to their social network, but the users may also provide additional signals about the nature of the user links. For instance, a user sending a link to a movie page is also likely to add an annotation that provides some qualitative signal concerning the movie (whether the user likes it or not). However, these annotations and/or other content are not fully utilized.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture augments a search result entry caption with keywords related to topics currently being shared. This can provide a much better idea of the content of the website or webpage.

More specifically, the architecture obtains a link from updates or posts of social topics of social network information sources (e.g., social networks for people places professionals, etc.), extracts title content of a document title associated with the link, compares the title content to document text for similarity to create non-duplicative content, creates keywords related to popular social topics from the non-duplicative content, and then augments a search result entry of a search result page with the keywords of the popular social topics.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
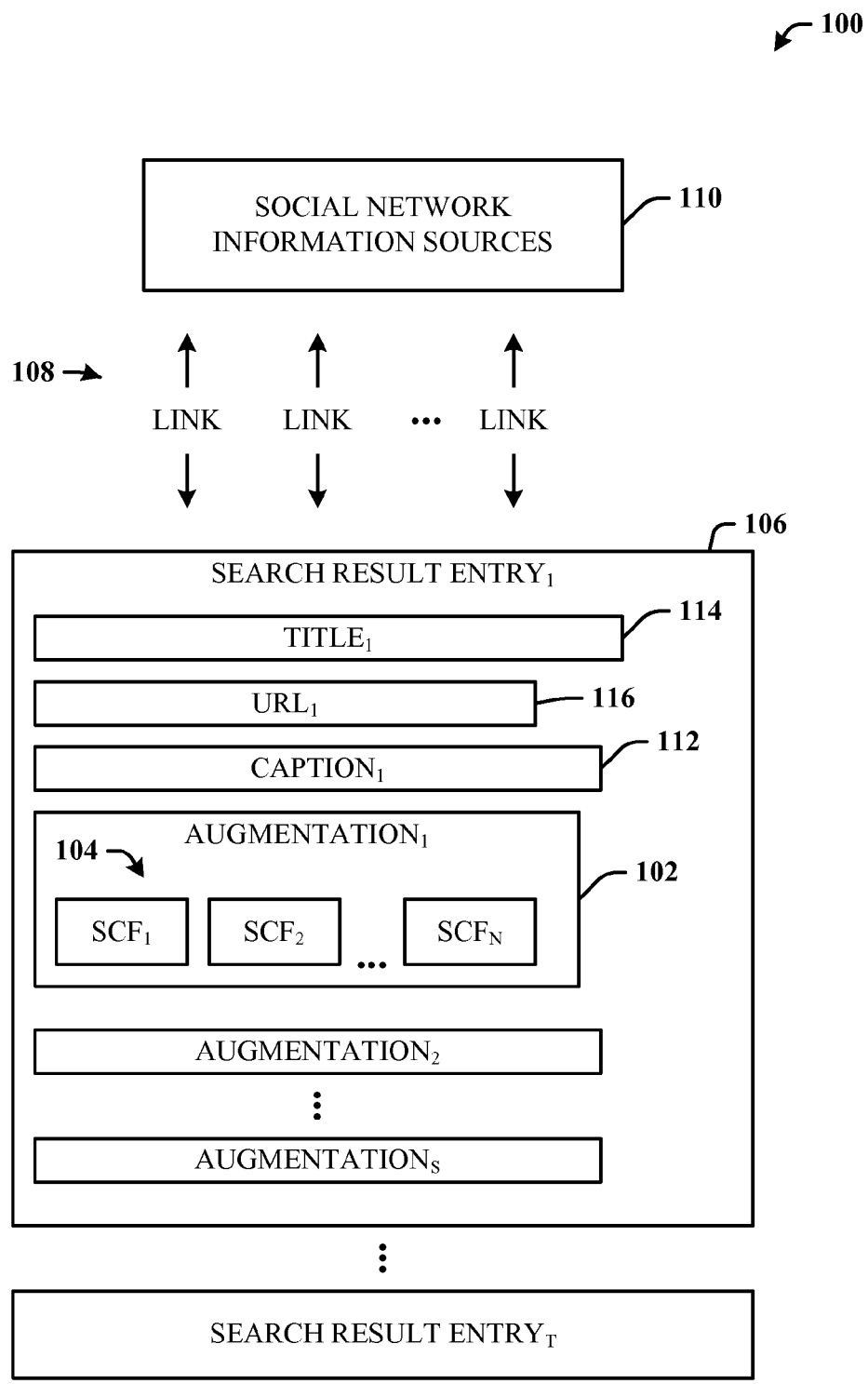
FIG. 1 illustrates a system in accordance with the disclosed architecture.

Mining annotations that are human-generated content can provide ranking signals, especially with regard to dynamic content being shared (e.g., viral videos, hot deals, breaking news, etc.). Additionally, annotations can be useful to improve understanding of content fragments (pieces of textual updates) and how the fragments change over time.

In the context of social media, social anchor text (link text, that is, text that is visible and clickable in a hyperlink) can be utilized as a short and concise summary provided by a user about a webpage. Analyzing social anchor text can provide new insights about how and when people share links in social media. Social updates are inherently very dynamic so mining this activity for certain domains can provide improved user satisfaction.

The disclosed architecture generates a dynamic document caption that contains fragments from one or more social network information sources (e.g., conversation). This dynamically augmented caption enables the user to see what other people are doing (e.g., discussing) about a particular website.

Given a set of social data, the architecture extracts all updates that contain a link (pointer, in an application of objects and object pointers). For each link, the related webpage is opened and the content of the title is extracted. The title is then matched against the text that surrounds (is associated with) the link. By using similarity measures that compare the text of the social update to the webpage title, the duplicate or near duplicate content can be discarded. The remaining non-duplicate content is then used for creating a new set of keywords that describes what people around the world are discussing about a particular domain (also referred to herein as a website). A new augmented caption is then created that includes the most popular keywords from the list.

In a different implementation, the disclosed architecture can be applied to objects, and object pointers. Given a set of data, the architecture extracts all updates that contain an object pointer. For each pointer, the related object is accessed and some object data is extracted. The object data is then compared to against the data associated with the pointer. By using similarity measures that compare the data of the update to the object data, duplicate or near duplicate content can be discarded. The remaining non-duplicate content is then used for creating a new set of keywords that describes a list of popular or most frequently active data in relation to the pointer object. A new augmented caption is then created that includes the most popular keywords from the list.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an augmentation 102 of social content fragments ($SCF_{1-N}$) 104 created and presented in association with a search result entry 106 of a search engine result page (SERP). The augmentation 102 of the social content fragments 104 are obtained via links 108 to social network information sources 110. The social network information sources 110 include at least one of a social network for places, a social network for professionals, a social network for people, a question and answer source, or a microblogging service. The social content fragments 104 are automatically updated based on updated social content of the social network information sources 110.

The links 108 are to documents from which document titles are extracted and processed to create non-duplicative content. The document titles are compared to link text using a similarity measure to generate similarity scores. The non-duplicative content is processed to create the social content fragments 104 presented in association with the search result entry 106. The social content fragments 104 are derived from at least one of tips, conversations, or questions of the social network information sources 110. The social content fragments 104 are updated dynamically based on the updated social content. The social content fragments 104 are presented in association with a caption 112 of the search result entry 106.

As shown, the search result entry 106 can be one of many search result entries (Search Result $Entry_{1-T}$) of a SERP. Additionally, the augmentation 102 can be one of many augmentations ($Augmentation_{1-S}$) created and presented in association with the caption 112 of the search result entry 106. As shown, each search result entry (e.g., search result entry 106) can further include a title 114 and a URL (uniform resource locator) 116 (e.g., www.company.com) for a domain (e.g., company.com).

Figure 2:
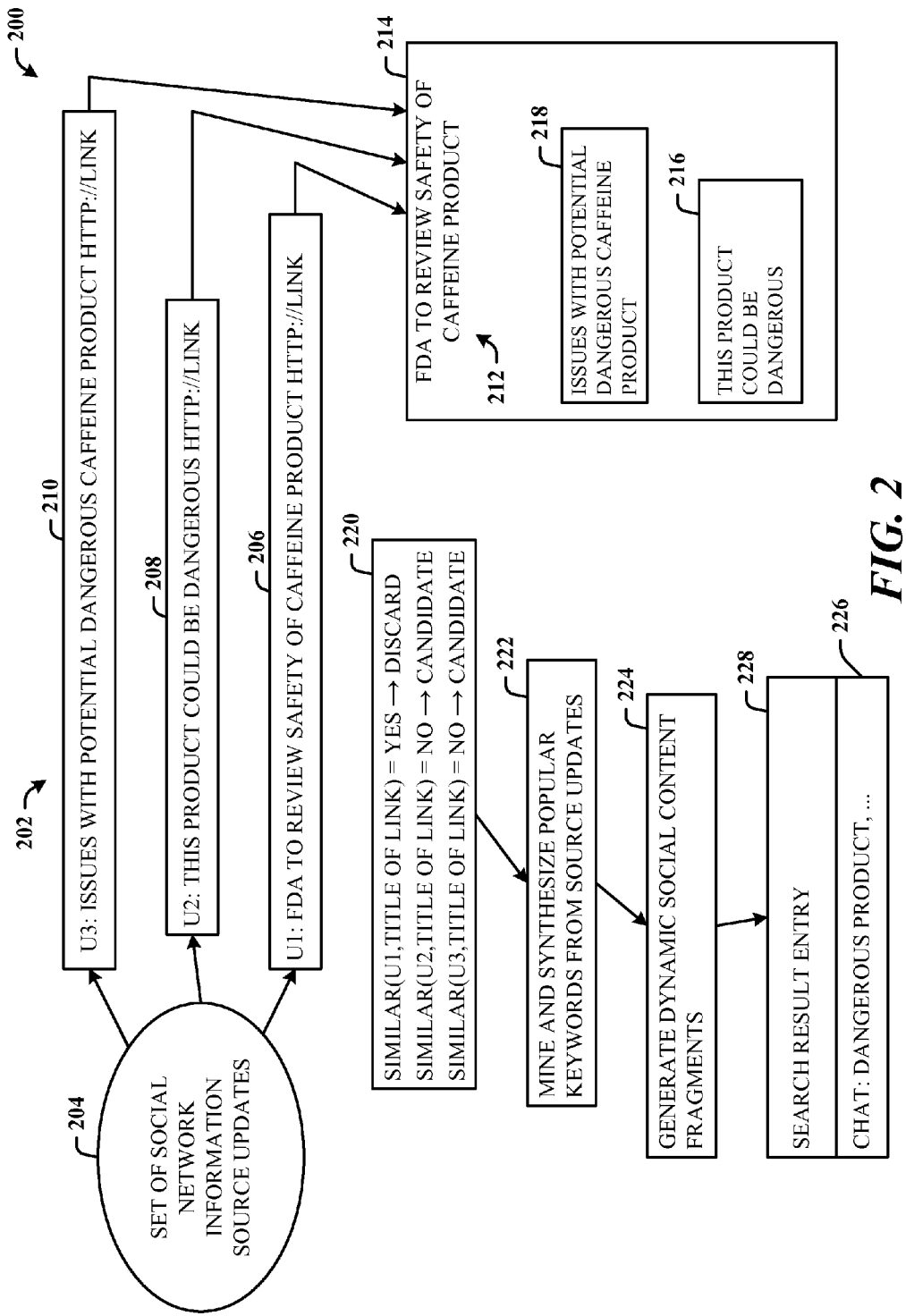
FIG. 2 illustrates a system that identifies updates with links for keyword creation in association with the search result caption.

FIG. 2 illustrates a system 200 that identifies updates with links 202 for keyword creation in association with the search result caption. The system 200 extracts the updates (e.g., microblog conversations) with links 202 from a set of social network information source updates 204. Here, three updates and links are identified: a first update (U1) 206, a second update (U2) 208, and a third update (U3) 210. The first update 206 includes text that is the title 212 of a document 214 and a link (http://link) to the document 214. The second update 208 includes text 216 that is also found on the document 214 and the link to the document 214. The third update 210 also includes text 218 that is also found on the document 214 and the link to the document 214.

A similarity algorithm is then applied to the update text and the title 212 associated with the link to compute a similarity score to enable the determination of duplicative or near duplicative content. Duplicative content is discarded and non-duplicative is retained as a candidate. The similarity score can be is calculated as a Jaccard score between the two sets of words (A and B) obtained from the update text and the title associated with of the URL. (The Jaccard coefficient is defined as: $|A \cap B|/|A \cup B|$.) Other similarity algorithms such as DICE's coefficient and edit distance, for example, can be employed to compute a measure of content similarity.

Accordingly, at 220, the similarity of the first update 206 text and the title at the link is computed to determine that both are similar, and hence, discarded. The similarity of the second update 208 text and the title at the link is computed to determine that both are not similar, and hence, a candidate. Likewise, similarity of the third update 210 text and the title at the link is computed to determine that both are not similar, and hence, a candidate.

At 222, the non-duplicative content (216 and 218) is then used to create a new set of keywords from the source updates 204. At 224, the social content fragments 226 (e.g., chat: dangerous product) are generated, and augmented to the search result entry 228 (the caption portion).

Following are specific examples that employ the disclosed architecture to compute caption augmentations of dynamic content from social streams (sources).

Figure 3:
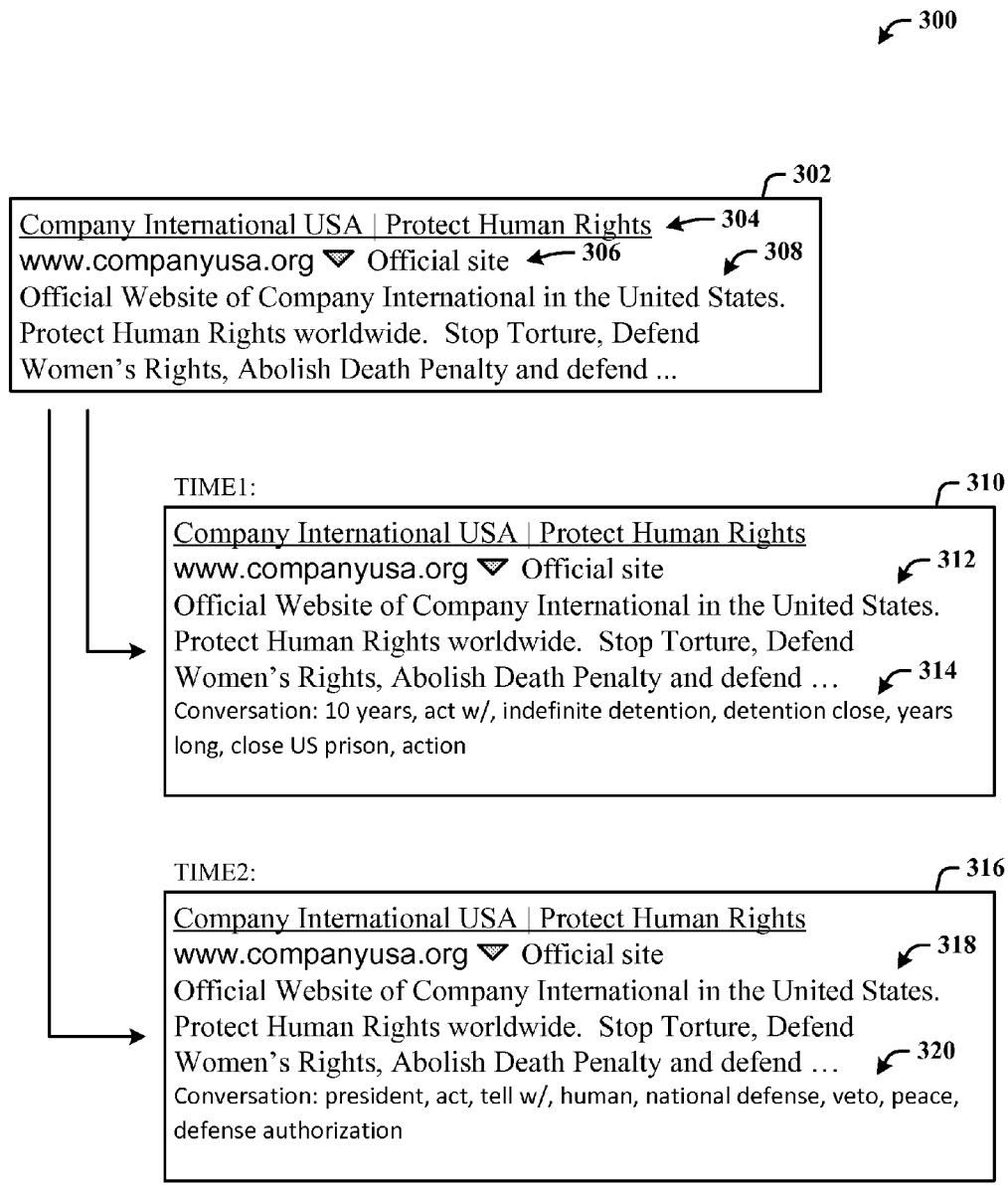
FIG. 3 illustrates a diagram where captions of search result entries as dynamically augmented with social content fragments.

FIG. 3 illustrates a diagram 300 where captions of search result entries as dynamically augmented with social content fragments. A first example illustrates a domain (www.companyusa.org) that is actively discussed in a social network, such as a microblog. Consider that a user has an interest in politics and discovered a new website called "Company USA" at www.companyusa.org. When the user searches using a search engine, the search result presentation of a search result 302 can include: the title 304, URL 306, and caption 308 that shows a portion of the content. It can be considered that the conventional caption 308 is static and unlikely to change much.

By analyzing a particular social networking dataset from a microblogging website at two periods of time (e.g., Time1 and Time2) and extracting all messages that contain a link to www.companyusa.org, it can be discovered what people were talking about at those particular times.

A search result entry 310 for Time1 includes the format and content of result 302, but a caption 312 (which includes the content of caption 308) now further includes an augmentation 314 of a single line denoted as "Conversation" with social content fragments (also called keywords) created from non-duplicative content.

Similarly, a search result entry 316 for Time2 includes the format and content of search result 302, but a caption 318 (which includes the content of caption 308) now further includes an augmentation 320 denoted as "Conversation" with social content fragments (also called keywords) created from non-duplicative content, that are now updated and different in some ways from the keywords of the augmentation 314 of search result entry 310.

Figure 4:
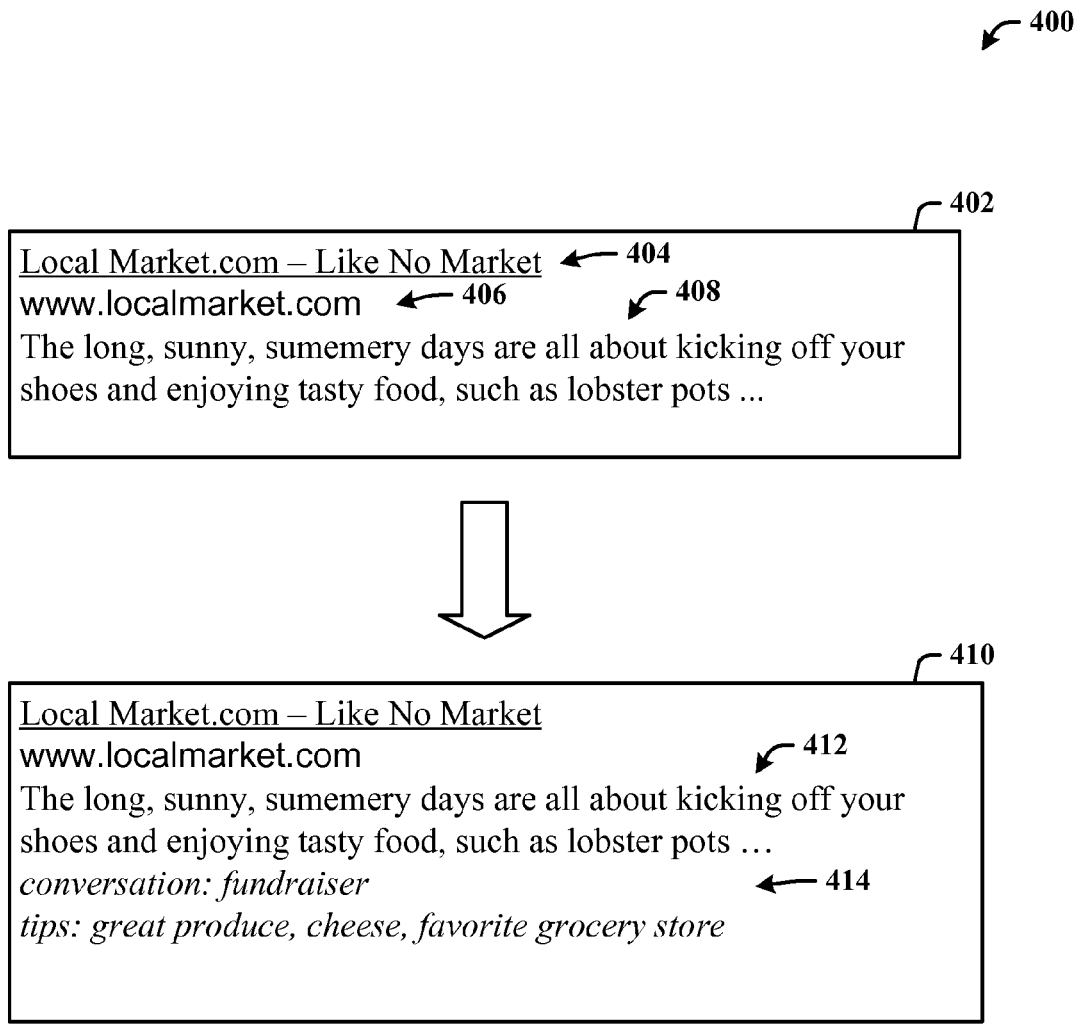
FIG. 4 illustrates a diagram where a caption of a search result entry is dynamically augmented with social content fragments from multiple social network information sources.

FIG. 4 illustrates a diagram 400 where a caption of a search result entry is dynamically augmented with social content fragments from multiple social network information sources. When the user searches using a search engine, the search result presentation of a search result 402 can include: the title 404, URL 406, and caption 408 that shows a portion of the content. It can be considered that the conventional caption 408 is static and unlikely to change.

An augmented search result 410 includes the format and content of search result 402, but a caption 412 (which includes the content of caption 408) now further includes an augmentation 414 of from two sources: a first denoted as "conversation" and a second denoted as "tips", both with social content fragments (keywords) created from non-duplicative content. The augmentation sources indicate there is some conversation about a fundraiser, and the majority of the tips are about produce and the store itself.

Figure 5:
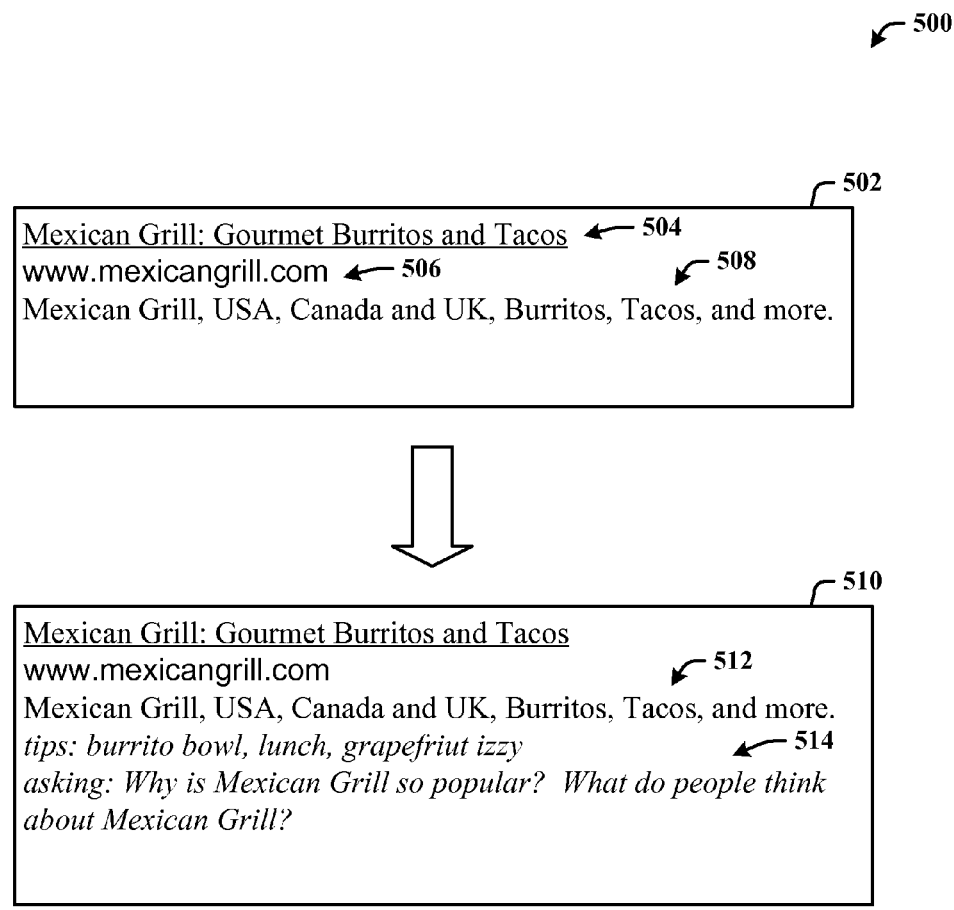
FIG. 5 illustrates another diagram where a caption of a search result entry is dynamically augmented with social content fragments from multiple social network information sources.

FIG. 5 illustrates another diagram 500 where a caption of a search result entry is dynamically augmented with social content fragments from multiple social network information sources. In this example, the domain contains tips in a social network information source for places and questions in a social network information source of questions and answers.

When the user searches using a search engine, the search result presentation of a search result 502 can include: the title 504, URL 506, and caption 508 that shows a portion of the content. It can be considered that the conventional caption 508 is static and unlikely to change.

An augmented search result 510 includes the format and content of search result 502, but a caption 512 (which includes the content of caption 508) now further includes an augmentation 514 of from two sources: a first augmentation denoted as "tips" and a second augmentation denoted as "asking", both with social content fragments (keywords) created from non-duplicative content.

In addition to the description of the site and location information (e.g., maps), the caption 512 is augmented by adding latest tips regarding the menu (under "tips") and questions— the Grill is also an active topic on a Question and Answering site; thus, the caption now includes a couple popular questions (under "asking").

When dealing with microblogging social sources that contain a URL, spam content can be reduced or prevented by restricting the dataset to users who have posted at least a threshold (e.g., ten) of microblog entries and have a minimum degree threshold (number of friends and number of followers). For example, the schema for a dataset can include: a user profile ID (identifier), text of the microblog entry (without the URL or stop words), URL, domain of the URL, title of the URL, caption of the URL, and similarity score.

From this dataset, n-grams (e.g., uni-grams and bi-grams) are extracted from the text of the microblog not contained in the title/caption of the URL. These various n-grams are aggregated over the various domains and the most frequently occurring n-grams ("annotations") are selected. The aggregated n-grams are used to capture the captions pertaining to the domain.

Further applications of the disclosed architecture include improved captions/summaries (the current domain captions are static and do not provide much information), different social annotations (improve the current social annotation for domains), annotation of a web page/domain with different social networking signals (e.g., from sources social sources of people, places, professionals, microblogs, question/answer services, etc.), a new way of presenting "active" content on the Internet, ranking (use the top keywords to re-rank actively discussed websites), and search engine optimization.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
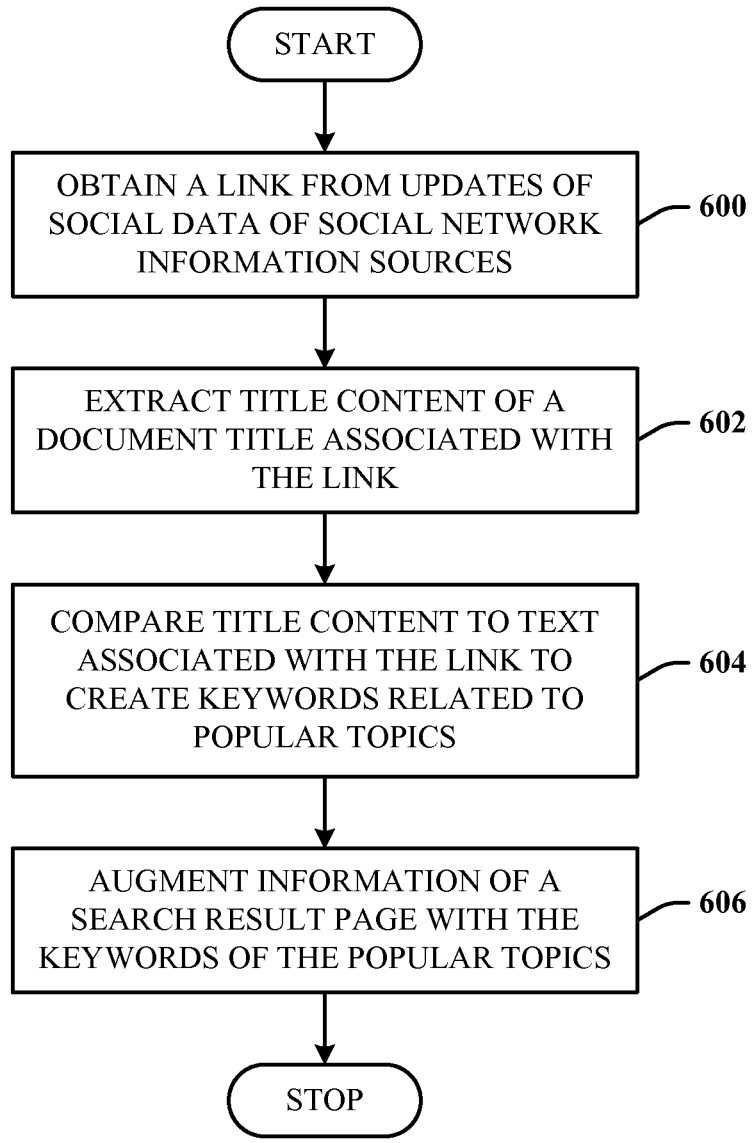
FIG. 6 illustrates a method in accordance with the disclosed architecture.

FIG. 6 illustrates a method in accordance with the disclosed architecture. At 600, a link is obtained from updates of social data of social network information sources. At 602, title content of a document title associated with the link is extracted. At 604, the title content is compared to text associated with the link to create keywords related to popular topics. At 606, information of a search result page is augmented with the keywords of the popular topics.

The method can further comprise comparing the title content to text associated with the link to create non-duplicative content, and creating keywords related to popular topics from the non-duplicative content. The method can further comprise comparing the title content to the text using a similarity measure to create a similarity score, and augmenting a search result entry of the search result page with the keywords. The method can further comprise augmenting a caption fly-out of a search result entry of the search result page with the keywords, and augmenting a specific vertical or part of the search result webpage with the keywords. A vertical can be a new search, an image search, a product search, etc.

Figure 7:
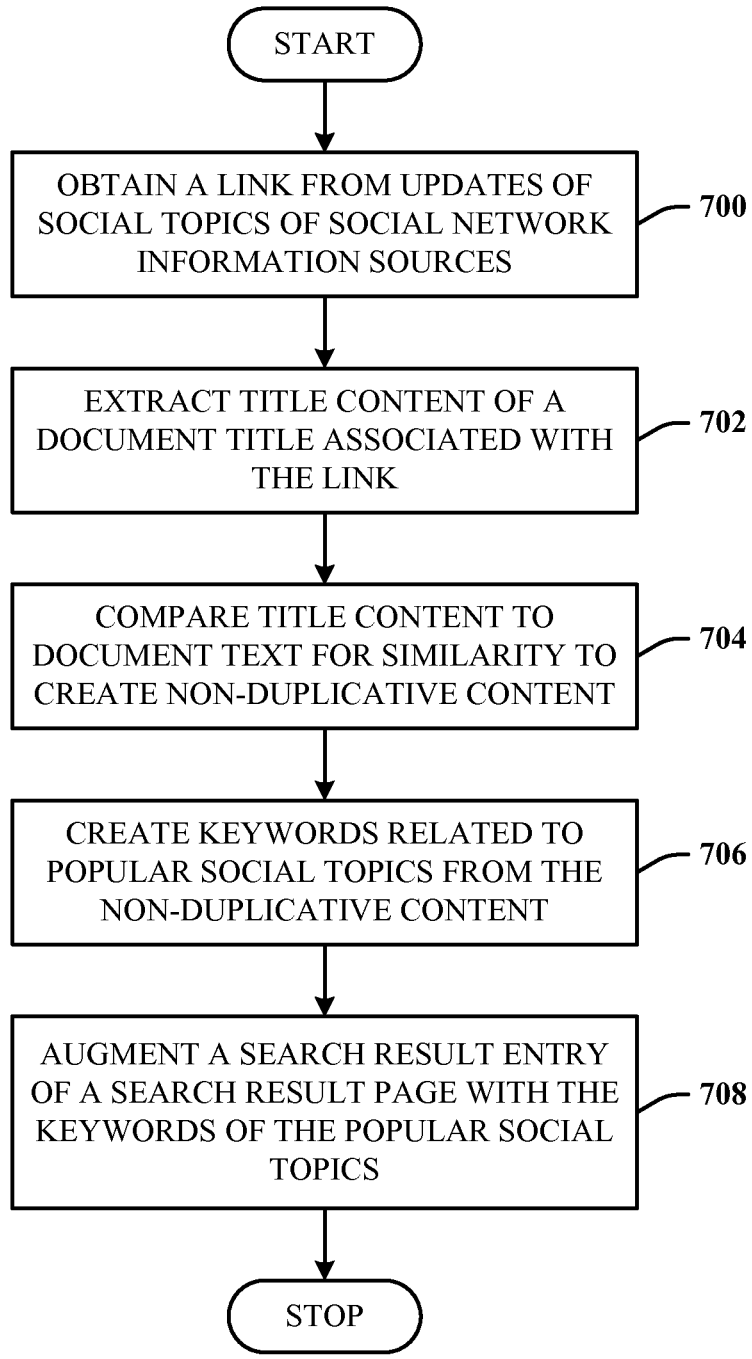
FIG. 7 illustrates an alternative method in accordance with the disclosed architecture.

FIG. 7 illustrates an alternative method in accordance with the disclosed architecture. At 700, a link is obtained from updates of social topics of social network information sources. At 702, title content of a document title associated with the link is extracted. At 704, the title content is compared to document text for similarity to create non-duplicative content. At 706, keywords related to popular social topics are created from the non-duplicative content. At 708, a search result entry of a search result page is augmented with the keywords of the popular social topics.

The method can further comprise augmenting a caption of the search result entry with the keywords as part of caption generation, and analyzing datasets of the social network information sources of a given time span to compute the popular social topics. The method can further comprise aging out a keyword over time based on aging criteria, and obtaining the link to updates of social network information sources that include at least one of a social network for places, a social network for professionals, a social network for people, a question and answer source, or a microblogging service. Since keywords can change based on conversations of people and the events, times, etc., associated with the keyword, it can be the case that the system simply applies a process of removing some keywords.

The disclosed architecture can be implemented to work in flyouts (graphical objects designed to appear in response to hover of a mouse cursor over another object and then disappear after a timeout or removal of the hover action, e.g., menus that expand left or right in response to a user input device hover or interaction with a user interface object) associated with a search result. Thus, the augmentation can be made part of the flyout, rather than the search result caption.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
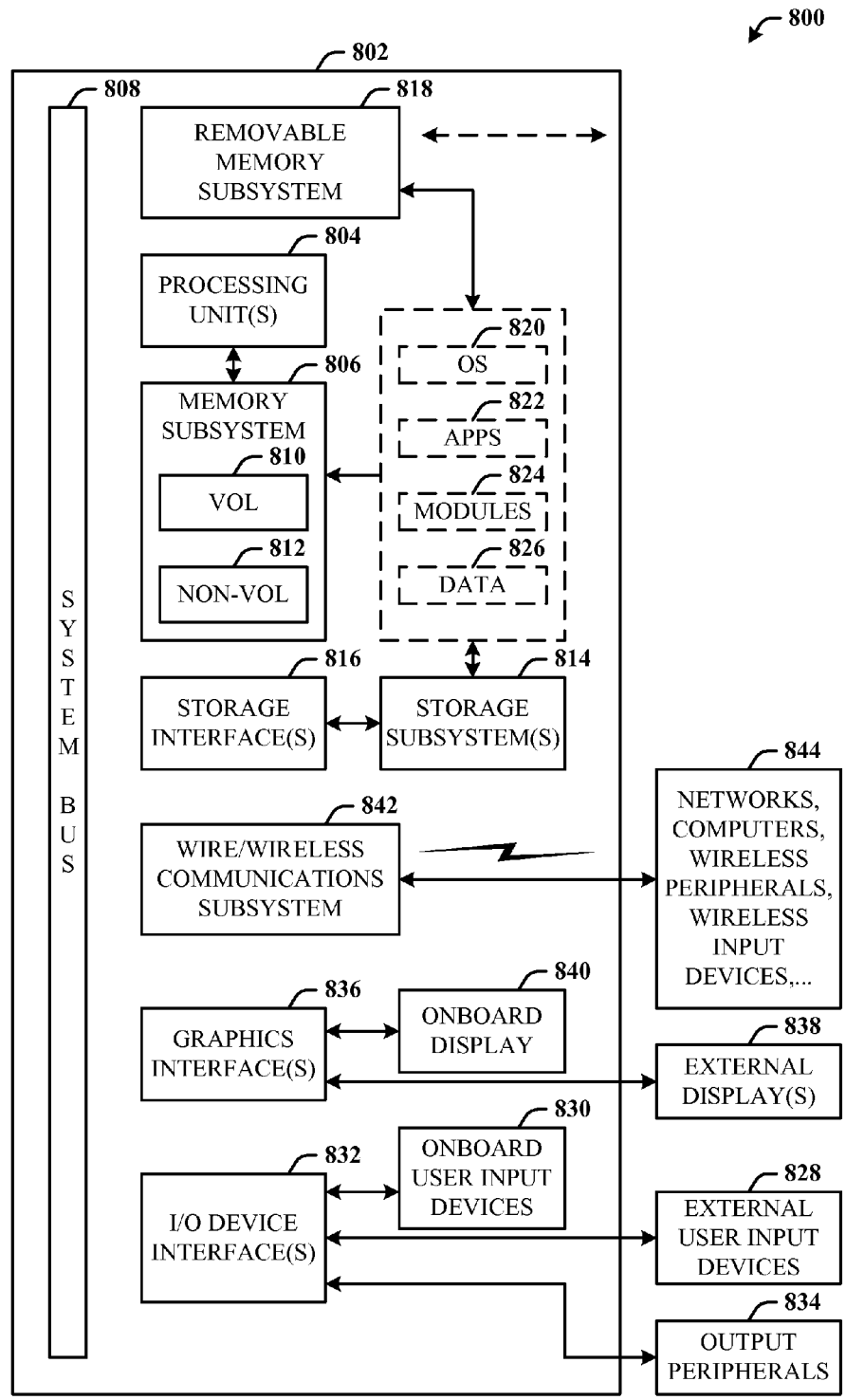
FIG. 8 illustrates a block diagram of a computing system that executes dynamic search result caption augmentation in accordance with the disclosed architecture.

Referring now to FIG. 8, there is illustrated a block diagram of a computing system 800 that executes dynamic search result caption augmentation in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the system 200 of FIG. 2, entities and components of the diagram 300 of FIG. 3, entities and components of the diagram 400 of FIG. 4, entities and components of the diagram 500 of FIG. 5, and the methods represented by the flowcharts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 802, and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example.

These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a search result entry, presented on a search result page from a user search performed using a search engine;
    an augmentation of the search result entry with social content fragments presented with the search result entry on the search result page, the augmentation obtained via links to social network information sources, the social content fragments are automatically updated on the search result page based on updated social content of the social network information sources, the social content fragments are keywords obtained from a comparison of title content of the links to document text to determine non-duplicative content; and
    a hardware microprocessor that executes computer-executable instructions associated with at least the augmentation.

2. The system of claim 1, wherein the links are to documents from which document titles are extracted and processed to create the non-duplicative content.

3. The system of claim 2, wherein the document titles are compared to link text using a similarity measure to generate similarity scores.

4. The system of claim 2, wherein the non-duplicative content is processed to create the social content fragments presented in association with the search result entry.

5. The system of claim 1, wherein the social network information sources include at least one of a social network for places, a social network for professionals, a social network for people, a question and answer source, or a microblogging service.

6. The system of claim 1, wherein the social content fragments are derived from at least one of tips, conversations, or questions of the social network information sources.

7. The system of claim 1, wherein the social content fragments are updated dynamically based on the updated social content.

8. The system of claim 1, wherein the social content fragments are presented in association with a caption of the search result entry.

9. A method performed by a computer system executing machine-readable instructions, the method comprising acts of:
    performing a search using a search engine to obtain a search result entry that is presented on a search result page;
    obtaining a link from updates of social data of social network information sources;
    extracting title content of a document title associated with the link;
    comparing the title content to text associated with the link to create keywords related to popular topics; and
    augmenting information of the search result entry on the search result page with the keywords of the popular topics corresponding to the updates of the social data of the social network information sources.

10. The method of claim 9, further comprising comparing the title content to text associated with the link to create non-duplicative content.

11. The method of claim 10, further comprising creating keywords related to popular topics from the non-duplicative content.

12. The method of claim 9, further comprising comparing the title content to the text using a similarity measure to create a similarity score.

13. The method of claim 9, further comprising augmenting the search result entry of the search result page with the keywords.

14. The method of claim 9, further comprising augmenting a caption fly-out of the search result entry of the search result page with the keywords.

15. The method of claim 9, further comprising augmenting a specific vertical of the search result page with the keywords.

16. A method performed by a computer system executing machine-readable instructions, the method comprising acts of:
    performing a user search using a search engine to obtain a search result entry presented on a search result page;
    obtaining a link from updates of social topics of social network information sources;
    extracting title content of a document title associated with the link;
    comparing the title content to document text for similarity to create non-duplicative content;
    creating keywords related to popular social topics from the non-duplicative content; and
    augmenting the search result entry of the search result page with the keywords of the popular social topics corresponding to the updates of the social topics of the social network information sources.

17. The method of claim 16, further comprising augmenting a caption of the search result entry with the keywords as part of caption generation.

18. The method of claim 16, further comprising analyzing datasets of the social network information sources of a given time span to compute the popular social topics.

19. The method of claim 16, further comprising aging out a keyword over time based on aging criteria.

20. The method of claim 16, further comprising obtaining the link to updates of social network information sources that include at least one of a social network for places, a social network for professionals, a social network for people, a question and answer source, or a microblogging service.

* * * * *